UNITED STATES PATENT OFFICE 2,485,987

AMINODIOXANES AS INSECTICIDES

Murray Senkus, Terre Haute, Ind., assignor to Commercial Solvents Corporation, Terre Haute, Ind., a corporation of Maryland No Drawing. Application February 19, 1944, Serial No. 523,089

4 Claims. (Cl. 167—33)

This invention relates to new and useful insecticidal compositions of wide utility, and is particularly concerned with toxic materials suitable for use in household insecticides.

The present invention is based upon the discovery that aminodioxanes of the following general structural formula possess high insecticidal activity against insects which are particularly difficult to exterminate,

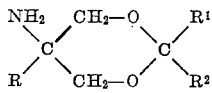

wherein R represents an alkyl group of from 1 to 2 carbon atoms, $R^1$ is either hydrogen or methyl, and $R^2$ is a hydrogen atom or an alkyl group having three or more carbon atoms, or an alkenyl group.

Aminodioxanes of the above type may be readily prepared in good yields by the general procedure described in my U. S. Patent No. 2,247,256. In accordance with the procedure there described, the corresponding nitro-1,3-dioxane is first prepared by heating approximately equivalent amounts of a suitable polyhydroxy nitro compound and the desired carbonyl compound in the presence of a small amount of an acid catalyst, such as hydrochloric acid, and if desired, in the presence of an organic liquid, such as benzene or toluene, which is capable of removing the water produced during the reaction as it is formed. Such a reaction is very general and may be effected between substantially any aldehyde or ketone, and polyhydroxy nitro compound. When no additional water appears to come over into the distillate, the residue containing the particular 5-nitro-1,3-dioxane is preferably distilled further under reduced pressure in order to remove any volatile impurities which might be present in the reaction mixture. These 5-nitro-1,3-dioxanes are, in general, white solids having relatively low melting points and may be further purified by recrystallization from methanol, water, or similar solvents. A detailed description of the exact procedure will be found in my U. S. Patent No. 2,297,921. The 5-nitro-1,3-dioxane thus prepared is then subjected to hydrogenation in the presence of a suitable hydrogenation catalyst, such as Raney nickel, and a solvent, such as methanol. The reduction is preferably carried out at a temperature of approximately 25° C. and at pressures of around 2000 pounds per sq. in.

Extracts of materials, such as pyrethrum flowers, derris, cube, timbo, barbasco, and the like have previously been widely used for the control of insect pests. These toxicants are generally used as constituents of dusting mixtures, petroleum distillate sprays, or in form of aqueous suspensions. Pyrethrum-containing compositions have a rapid paralyzing action on flies and other insects, but give a relatively low kill as compared to the per cent knocked down. With rotenone, a high kill is generally obtained although a considerable period of time is required to destroy the insects. The plant extracts are generally unstable and lose their activity to a considerable degree upon standing for any period of time. Also, there has been a number of synthetic preparations proposed for use as contact insecticides. However, the majority of such compounds that possess the greatest effectiveness have a highly objectionable odor, and hence, are not entirely satisfactory for household and other uses.

I have now discovered that the 5-amino-1,3-dioxanes of the class referred to above are capable of functioning as very efficient contact insecticides and at the same time are free from the foregoing objectionable characteristics of insecticidal compositions that have previously been employed.

The exact proportions of 5-amino-1,3-dioxanes utilized will be found to vary rather widely and to a certain extent depend upon the particular 5-amino-1,3-dioxane under consideration, the type of composition in which such insecticide is being employed, and the nature of the insect pests to be controlled. Generally speaking, however, a concentration of from about 4 to 7 per cent based on the total weight of the final insecticidal composition will be found sufficient. Any of the common vehicles or solvents employed in insecticide sprays, such as kerosene, "Ultrasene," or other like petroleum distillates may be used in preparing the insecticidal compositions of my invention.

The effectiveness of the insecticidal compositions of my invention was determined in accordance with a modification of the standard Peet Grady test. This procedure for testing insecticidal compositions is described in the 1940 "Blue Book," published by the publisher of "Soap and Sanitary Chemicals" periodical on pages 193 to 197. In actual practice, this type of test consists of releasing from 100 to 150 housefly adults (five day old houseflies were used for the present tests) in an air-conditioned cage, 6' x 6' x 6', and spraying them with 6 ml. of insecticide.

After ten minutes' exposure, the number of flies incapacitated or knocked down is noted and all flies are then transferred to a cage and allowed to recuperate in fresh air for 24 hours at which time the dead flies are counted. In carrying out these tests, the 5-amino-1,3-dioxanes were mixed with kerosene in concentrations ranging from 4 to 7 per cent and compared with an official test insecticide (O. T. I.) containing 5 per cent pyrethrum extract in kerosene. In certain instances, the effectiveness of the 5-amino-1,3-dioxanes as insecticides was also compared with one of the more effective synthetic materials which has found rather wide application as a household insecticide.

The table which follows shows the results obtained by testing these various insecticides in the manner generally described above. The average per cent kill there shown represents from between thirty and one hundred twenty individual tests.

Table

| Compound | Concentration, Percent | Average Percent Kill | Average O. T. I. Percent Kill | Average Percent Kill of Commercial insecticide |
|---|---|---|---|---|
| 5-Amino-5-ethyl-2-(1-ethylpentyl)-1,3-dioxane | 5 | 77.4 | 58.2 | 72.4 |
|  | 6 | 87.5 | 67.2 | 72.2 |
| 5-Amino-5-ethyl-1,3-dioxane | 5 | 43.0 | 37.7 |  |
| 5-Amino-5-ethyl-2-propyl-1,3-dioxane | 5 | 54.0 | 46.5 |  |
| 5-Amino-5-ethyl-2-methyl-1,3-dioxane | 5 | 44.0 | 59.0 |  |
| 5-Amino-5-methyl-1,3-dioxane | 5 | 35.0 | 31.6 |  |
| 5-Amino-5-ethyl-2-(1-ethylpentenyl)-1,3-dioxane | 4 | 53.8 | 53.6 |  |
|  | 5 | 72.5 | 54.5 | 58.3 |
|  | 6 | 74.6 | 55.1 | 67.2 |
|  | 7 | 83.5 | 64.4 | 67.2 |
| 5-Amino-5-ethyl-2-methyl-2-isobutyl-1,3-dioxane | 5 | 44.6 | 56.4 |  |
| 5-Amino-5-ethyl-2-hexyl-2-methyl-1,3-dioxane | 5 | 78.2 | 71.1 |  |
| 5-Amino-5-ethyl-2-hendecyl-1,3-dioxane | 5 | 72.5 | 81.6 |  |
|  | 6 | 99.0 | 82.3 |  |

In view of the data appearing in the above table, it can be seen that the 5-amino-1,3-dioxanes possess insecticidal activity that compares favorably with insecticidal compositions that have previously been available for use. It will also be apparent that such compounds in addition to being useful by themselves in insecticide sprays constitute a valuable adjunct to toxicants which have previously been employed for similar purposes. Thus, the 5-amino-1,3-dioxanes of my invention may be utilized, in conjunction with materials such as pyrethrum, rotenone, derris extract, nicotine, organic thiocyanates, and the like.

The insecticidal compositions of my invention may be applied in a number of different ways. For use as household insecticides, the 5-amino-1,3-dioxanes may be dissolved in kerosene or similar petroleum distillates with or without the addition of other toxicants and sprayed. For use on plants, the 5-amino-1,3-dioxanes may be dissolved in various plant spraying oils and emulsified in water to produce sprayable emulsions. Any of the common emulsifying agents utilized for such purposes can be employed in conjunction with the insecticidal compositions.

In like manner, the 5-amino-1,3-dioxanes themselves without the addition of a solvent may be emulsified and used as plant spray insecticides.

While my invention has been described with particular reference to the specific 5-amino-1,3-dioxanes shown in the above table, it is to be strictly understood that it is not limited thereto, but on the contrary, is to be construed broadly and restricted solely to the scope of the claims that follow.

Now having described my invention, what I claim is:

1. An insecticidal composition comprising an inert carrier liquid and, as an essential active ingredient, from about 4 to 7 per cent by weight of a 5-amino-1,3-dioxane having the following structural formula:

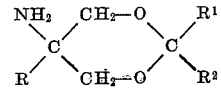

in which R represents an alkyl group of from 1 to 2 carbon atoms, $R^1$ represents substituents selected from the group consisting of hydrogen and methyl, and $R^2$ represents a substituent selected from the class consisting of hydrogen, an alkyl group having in excess of 2 carbon atoms, and an alkenyl group.

2. The composition of claim 1 wherein the carrier is a petroleum distillate.

3. The composition of claim 1 wherein the carrier is kerosene.

4. The composition of claim 1 wherein the carrier is an oil-water emulsion.

MURRAY SENKUS.

REFERENCES CITED

The following references are of record in the file of this patent:

UNITED STATES PATENTS

| Number | Name | Date |
|---|---|---|
| 2,164,355 | Slagh | July 4, 1939 |
| 2,163,356 | Slagh | July 4, 1939 |
| 2,247,256 | Senkus | June 24, 1941 |
| 2,297,921 | Senkus | Oct. 6, 1942 |